(12) United States Patent
Kim et al.

(10) Patent No.: US 12,316,214 B2
(45) Date of Patent: May 27, 2025

(54) APPARATUS AND METHOD FOR CONTROLLING POWER FACTOR CORRECTION TO SUPPRESS OVERCURRENT

(71) Applicants: Hyundai Motor Company, Seoul (KR); Kia Corporation, Seoul (KR)

(72) Inventors: Jee Heon Kim, Hwaseong-si (KR); Dong Gyun Woo, Hwaseong-si (KR); Chul Soon Kim, Guri-si (KR); Hui Sung Jang, Hwaseong-si (KR); Sung Uk Park, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 357 days.

(21) Appl. No.: 17/872,270

(22) Filed: Jul. 25, 2022

(65) Prior Publication Data

US 2023/0097935 A1    Mar. 30, 2023

(30) Foreign Application Priority Data

Sep. 28, 2021    (KR) .......................... 10-2021-0128053

(51) Int. Cl.
*H02M 1/42*    (2007.01)
*H02M 1/32*    (2007.01)

(52) U.S. Cl.
CPC ........... *H02M 1/4208* (2013.01); *H02M 1/32* (2013.01); *Y02B 70/10* (2013.01)

(58) Field of Classification Search
CPC ........ H02M 1/4208; H02M 1/42; H02M 1/32; Y02B 70/10; Y02T 10/70; Y02T 10/7072; H02J 7/02; H02J 7/00; B60L 53/22
See application file for complete search history.

(56) References Cited

U.S. PATENT DOCUMENTS

| | | | | |
|---|---|---|---|---|
| 6,178,101 B1* | 1/2001 | Shires | ..................... | H02M 1/44 |
| | | | | 363/39 |
| 7,053,569 B2* | 5/2006 | Takahashi | ............... | H02P 23/26 |
| | | | | 318/504 |
| 8,674,544 B2* | 3/2014 | Rada | ........................ | G05F 1/70 |
| | | | | 307/38 |

(Continued)

FOREIGN PATENT DOCUMENTS

| KR | 20070079493 A | * | 8/2007 | .......... H02M 1/4208 |
|---|---|---|---|---|
| KR | 20190099595 A | | 8/2019 | |

OTHER PUBLICATIONS

Translation KR-20070079493 (Year: 2007).*

*Primary Examiner* — Thienvu V Tran
*Assistant Examiner* — Yahveh Comas Torres
(74) *Attorney, Agent, or Firm* — Slater Matsil, LLP (57) ABSTRACT

An embodiment control device includes a voltage controller configured to output an input current command value of a power factor correction (PFC) based on an output voltage and an output voltage command value of the PFC, a current controller configured to control an input current of the PFC by determining a switching duty of the PFC based on the input current command value, and a current command upper limit generator configured to output an input current command upper limit value of the PFC based on an input current limit value and an input current command offset value of the PFC, wherein the input current command upper limit value has an alternating current (AC) component.

20 Claims, 8 Drawing Sheets

(56) References Cited

U.S. PATENT DOCUMENTS

| | | | | |
|---|---|---|---|---|
| 8,872,484 B2* | 10/2014 | Kim | ................. | H02M 1/4225 |
| | | | | 323/205 |
| 9,484,804 B2* | 11/2016 | Seong | ................. | H02M 1/4208 |
| 10,164,521 B2* | 12/2018 | Castelli | ................. | H02M 1/42 |
| 10,396,655 B2* | 8/2019 | Zhao | ................. | H02M 1/4225 |
| 10,763,744 B2* | 9/2020 | Son | ................. | H02M 1/4208 |
| 10,819,224 B2* | 10/2020 | Zhao | ................. | H02M 1/4225 |
| 11,068,005 B2* | 7/2021 | Poon | ................. | H02M 1/4208 |
| 11,226,648 B2* | 1/2022 | Wang | ................. | G01R 21/006 |
| 11,275,397 B2* | 3/2022 | Wang | ................. | H02M 1/4208 |
| 2004/0232863 A1* | 11/2004 | Takahashi | ................. | H02P 23/26 |
| | | | | 318/432 |
| 2013/0043847 A1* | 2/2013 | Kim | ................. | H02M 1/4225 |
| | | | | 323/205 |
| 2013/0249397 A1* | 9/2013 | Chandran | ................. | H05B 47/185 |
| | | | | 315/85 |
| 2015/0171740 A1* | 6/2015 | Seong | ................. | H02M 1/4208 |
| | | | | 320/162 |
| 2015/0180384 A1* | 6/2015 | An | ................. | H02M 1/4225 |
| | | | | 318/400.3 |
| 2019/0084439 A1* | 3/2019 | Jang | ................. | H02M 1/4208 |
| 2019/0260287 A1* | 8/2019 | Son | ................. | H02M 1/4208 |

* cited by examiner

APPARATUS AND METHOD FOR CONTROLLING POWER FACTOR CORRECTION TO SUPPRESS OVERCURRENT

CROSS-REFERENCE TO RELATED APPLICATIONS

The present application claims the benefit of Korean Patent Application No. 10-2021-0128053, filed on Sep. 28, 2021, which application is hereby incorporated herein by reference.

TECHNICAL FIELD

The disclosure relates to an apparatus and a method for controlling power factor correction.

BACKGROUND

In general, plug-in hybrid cars and electric cars (a type of eco-friendly vehicles) have a separate on-board charger (OBC) configured to convert external power (for example, domestic AC power) into chargeable DC power, thereby generating a high-voltage battery charging current, such that the batteries accumulate electric energy necessary for traveling through the OBC from external AC power (domestic AC power), thereby driving eco-friendly vehicles.

The OBC of eco-friendly vehicles includes power factor correction (PFC) for controlling the power factor of input currents and a DC-DC high-voltage converter for controlling up/down conversion of output voltages.

A PFC controller for controlling the PFC is divided into a voltage controller for controlling a DC link voltage (Vlink), which corresponds to a PFC output terminal, and a current controller for controlling an input current (Iin) that is input to the PFC. PFC control exists to satisfy power factor (PF) and total harmonic distortion (THD) regulations.

The voltage controller of the PFC outputs a root-mean-square (RMS) command of an output-terminal current of the PFC. Specifically, if the output value of the voltage controller is multiplied by a signal obtained by dividing the input voltage of input power by a peak value, a PFC input-terminal current command (Iin*, having identical phase and shape as input voltage) is obtained. The PFC current controller controls the PFC by generating a duty such that the PFC input-terminal current (Iin) becomes identical to the current command (Iin*) through proportional integral (PI) control.

Meanwhile, if the input voltage applied to the OBC drops abruptly (or other types of adverse conditions occur), an overcurrent instantly occurs in the OBC. There is a problem in that, if such an input overcurrent occurs, the electric vehicle supply equipment (EVSE) shuts down automatically and causes a charging delay situation, thereby inconveniencing the user.

The above descriptions regarding background technologies have been made only to help understanding of the background of the present disclosure, and are not to be deemed by those skilled in the art to correspond to already-known prior art.

SUMMARY

The disclosure relates to an apparatus and a method for controlling power factor correction (PFC). Particular embodiments relate to an apparatus and a method for PFC control capable of preventing an electric car charging facility from being shut down by application of an overcurrent to the PFC of an eco-friendly vehicle.

An embodiment of the disclosure provides an apparatus and a method for PFC control, wherein the upper limit value of an input current command of a PFC is configured to have an AC component, instead of a fixed constant value, so as to minimize the margin between the input current command and the upper limit value of the input current command such that an electric vehicle supply equipment (EVSE) is prevented from shut down by suppressing the occurrence of an overcurrent due to an excessive margin between the input current command and the upper limit value of the input current command, thereby providing user convenience. Above-described technical aspects are not limiting, and other technical aspects may be derived from the following description.

A PFC control device according to an embodiment of the disclosure includes a voltage controller configured to output an input current command value of a PFC based on an output voltage and an output voltage command value of the PFC, a current controller configured to control an input current of the PFC by determining a switching duty of the PFC based on the input current command value, and a current command upper limit generator configured to output an input current command upper limit value of the PFC based on an input current limit value and an input current command offset value of the PFC, wherein the input current command upper limit value has an AC component.

The input current command upper limit value may have the same AC component as that of the input current command value.

The input current command offset value may be calculated based on a phase component (theta) value for synchronization with a power source current applied to the PFC from an external AC power source.

The phase component may be a value calculated from the external AC power source by means of a phase locked loop (PLL).

The input current command offset value ($I_{PFC\_d\_Ref\_Offset}$) may be $I_{PFC\_d\_Ref\_Offset} = \alpha * \sin(2\text{theta}) \pm \beta$, where $\alpha = k * \Delta V_{link}$ may be satisfied, and $$\Delta V_{link} = \frac{P_0}{2\pi f_{ac} \cdot V_{link} \cdot C_{link}}$$

($V_{link}$: output voltage, $f_{ac}$: external AC voltage frequency, and $P_o$: output power).

The input current command upper limit value ($I_{PFC\_d\_Ref\_Max}$) may satisfy $I_{PFC\_d\_Ref\_Max} = \sqrt{2} * \text{Min}(I_{ac\_Lmt\_Algo}, I_{ac\_Lmt\_VCMS}) + I_{PFC\_d\_Ref\_Offset}$ ($I_{ac\_Lmt\_Algo}$: internal input current limit value, $I_{ac\_Lmt\_VCMS}$: external input current value, and $I_{PFC\_d\_Ref\_Offset}$: input current command offset value).

The input current command value may be an input current d-axis command value, the input current command upper limit value may be an input current d-axis command upper limit value, and the input current command offset value may be an input current d-axis command offset value.

The output voltage of the PFC may be a DC link terminal voltage between the PFC and a high voltage converter.

The voltage controller may perform PI control so that the output voltage of the PFC follows the output voltage command value.

The input current limit value of the PFC may be configured to be a smaller value among an internal input current limit value predetermined with regard to the PFC and an external input current limit value determined by another controller.

The input current command value may be determined based on a value, obtained by performing PI-control of the output voltage and the output voltage command value, and the input current command upper limit value.

A PFC control method according to another embodiment of the disclosure includes calculating an input current command upper limit value of a PFC based on an input current limit value and an input current command offset value of the PFC, calculating an input current command value of the PFC based on an output voltage, an output voltage command value, and the calculated input current command upper limit value of the PFC, and controlling the PFC by using the input current command value, wherein the input current command upper limit value has an AC component.

The input current command upper limit value may have the same AC component as that of the input current command value.

The input current command offset value may be calculated based on a phase component (theta) value for synchronization with a power source current applied to the PFC from an external AC power source.

The phase component may be a value calculated from the external AC power source by means of a phase locked loop (PLL).

The upper limit value of an input current command of a PFC may be configured to have an AC component, instead of a fixed constant value, so as to minimize the margin between the input current command and the upper limit value of the input current command such that an EVSE is prevented from shut down by suppressing the occurrence of an overcurrent due to an excessive margin between the input current command and the upper limit value of the input current command, thereby providing user convenience.

BRIEF DESCRIPTION OF THE DRAWINGS

The above and other aspects, features, and advantages of embodiments of the disclosure will be more apparent from the following detailed description taken in conjunction with the accompanying drawings, in which.

DETAILED DESCRIPTION OF ILLUSTRATIVE EMBODIMENTS

Hereinafter, embodiments of the disclosure will be described in detail with reference to the accompanying drawings.

The disclosure relates to a PFC control device and method, in which an input current command upper limit value of a PFC is calculated to be a value having an alternating current (AC) component, and the PFC is controlled using the same, so as to suppress overcurrent from occurring in the PFC. In the following, this can be simply referred to as a "PFC control device" and "PFC control method", respectively.

Figure 1:
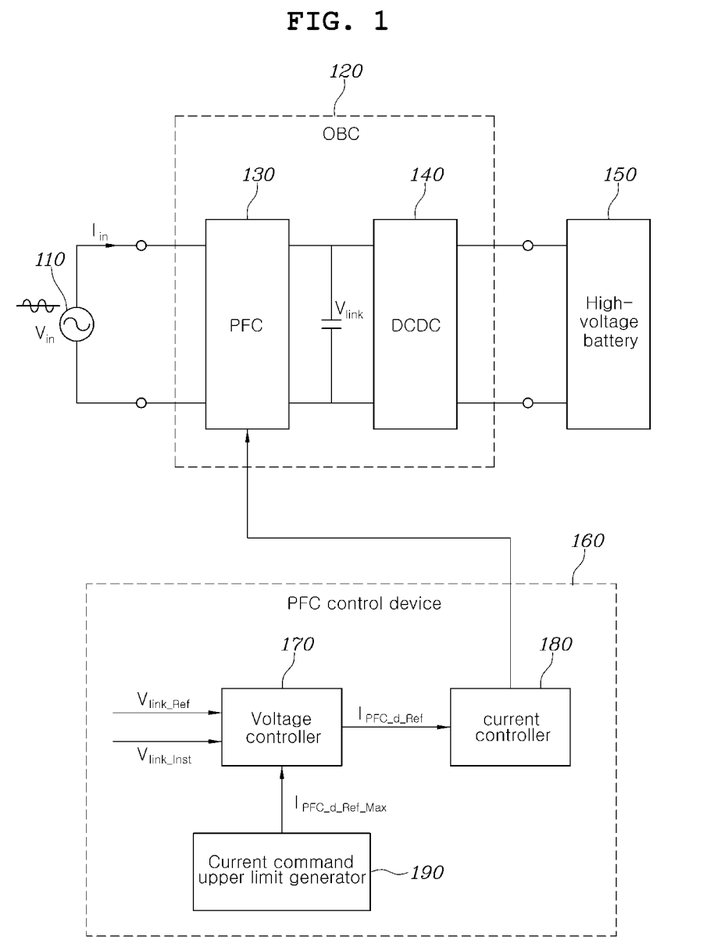
FIG. 1 is a conceptual diagram of a charging system of an eco-friendly vehicle for helping understanding of the disclosure.

FIG. 1 is a conceptual diagram of a charging system of an eco-friendly vehicle for helping understanding of the disclosure.

Referring to FIG. 1, an external AC power source no is connected to the vehicle, and the external AC power source is connected to an OBC 120 of the vehicle. The OBC 120 includes a PFC 130 and a high voltage converter 140, and a high voltage battery 150 is charged/discharged through the high voltage converter 140.

A PFC control device 160 is a device for controlling the PFC 13o, and is configured to include a voltage controller 17o, a current controller 18o, and a current command upper limit generator 190.

The voltage controller 170 controls a PFC output terminal voltage by using a PFC output voltage and a PFC output voltage command value. The current controller 180 controls a PFC input terminal current by deriving a PFC input current command value using the output of the voltage controller 170 and deriving a PFC duty using the PFC input current command value and a PFC input current value. The current command upper limit generator 190 derives an input current command upper limit value for limitation of the upper limit of the input current command value.

More specifically, the voltage controller 170 may receive an output voltage sensing value obtained by detecting an output voltage ($V_{link\_Inst}$) of the PFC 130 using a sensor and the like, and an output voltage command value ($V_{link\_Ref}$) corresponding to the voltage to be output by the PFC 130, and may generate an input current command value ($I_{PFC\_d\_Ref}$) for minimizing the error between the output voltage sensing value and the output voltage command value by using a general controller such as a proportional integral (PI) or proportional-integral-derivative (PID) controller.

The current controller 180 may receive the input current command value ($I_{PFC\_d\_Ref}$) provided from the voltage controller 170 and an input current sensing value ($I_{PFC\_d\_Inst}$) detected at the input terminal of the PFC 130 through a sensor and the like, and may determine the duty of a switching element in the PFC 130 for minimizing the error between the input current sensing value and the input current command value by using a conventional controller such as a proportional integral (PI) or proportional-integral-derivative (PID) controller.

Figure 2A:
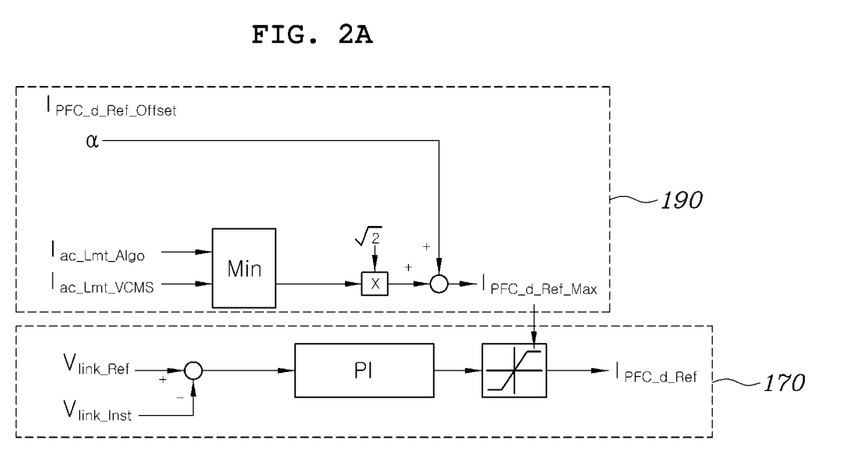
FIG. 2A illustrates a conventional PFC control device.

FIG. 2A illustrates a conventional PFC control device 160. More specifically, FIG. 2A illustrates the operations of the voltage controller 170 and the current command upper limit generator 190 of the conventional PFC control device 160.

Referring to FIG. 2A, the current command upper limit generator 190 of the conventional PFC control device 160 derives the input current command upper limit value ($I_{PFC\_d\_Ref\_Max}$) by using the smaller value among an internal input current limit value ($I_{ac\_Lmt\_Algo}$) predetermined with regard to the PFC and an external input current limit value ($I_{ac\_Lmt\_VCMS}$) determined by another controller (e.g., a charge management system controller and the like), and an input current command offset value ($I_{PFC\_d\_Ref\_Offset}$).

Here, the input current command offset ($I_{PFC\_d\_Ref\_Offset}$) has a value of $\alpha = k*\Delta V_{link}$, where $$\Delta V_{link} = \frac{P_0}{2\pi f_{ac} \cdot V_{link} \cdot C_{link}}$$

($V_{link}$: link voltage, $f_{ac}$: external AC voltage frequency, and $P_o$: output power).

Accordingly, the input current command upper limit value ($I_{PFC\_d\_Ref\_Max}$), which can be expressed as a value of $\sqrt{2}*\text{Min}$ ($I_{ac\_Lmt\_Algo}$, $I_{ac\_Lmt\_VCMS}$)+$I_{PFC\_d\_Ref\_Offset}$, has a predetermined constant value.

The voltage controller 170 of the conventional PFC control device 160 receives an output link voltage command value ($V_{link\_Ref}$) and an output link voltage sensing value ($V_{link\_hist}$) to perform PI control thereof, and then derives the input current command value ($I_{PFC\_d\_Ref}$) by reflecting the input current command upper limit value ($I_{PFC\_d\_Ref\_Max}$) derived from the current command upper limit generator 190.

Accordingly, the input current command value ($I_{PFC\_d\_Ref}$) has an AC component, and the input current command upper limit value ($I_{PFC\_d\_Ref\_Max}$) has a predetermined fixed value.

Figure 2B:
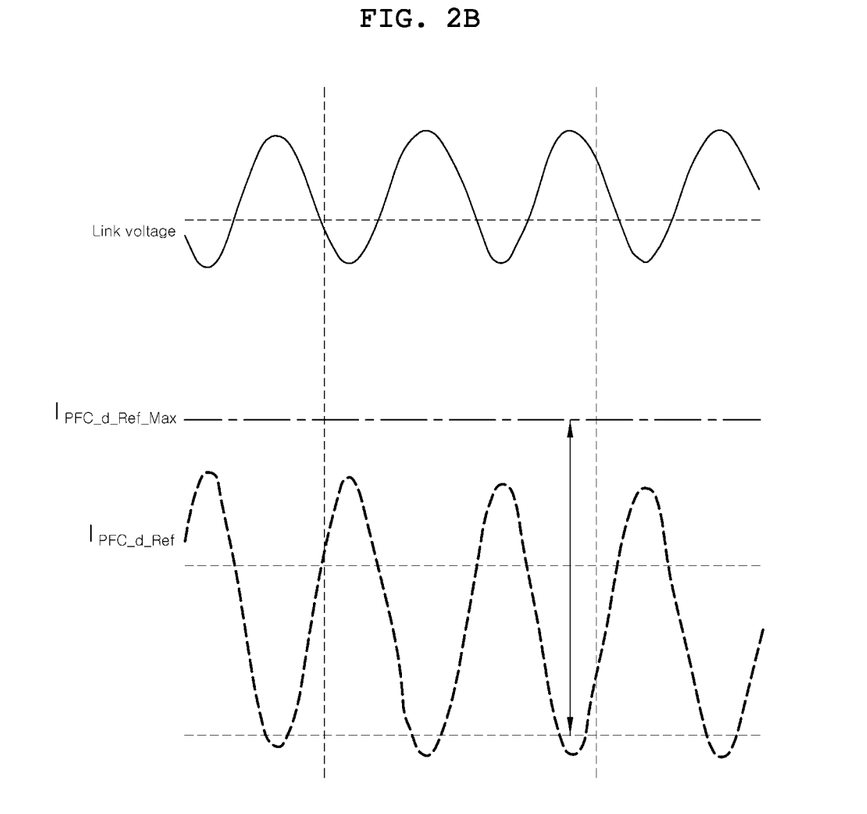
FIG. 2B illustrates a link voltage, which is an output voltage of the PFC, an input current command value calculated based on the link voltage, and an input current command upper limit value according to the conventional PFC control device.

FIG. 2B illustrates a link voltage, which is an output voltage of the PFC, an input current command value ($I_{PFC\_d\_Ref}$) calculated based on the link voltage, and an input current command upper limit value ($I_{PFC\_d\_Ref\_Max}$).

Referring to FIG. 2B, unlike the case in which the input current command upper limit value ($I_{PFC\_d\_Ref\_Max}$) has a fixed value, since the input current command value ($I_{PFC\_d\_Ref}$) has an AC component, the lowest point of the input current command value ($I_{PFC\_d\_Ref}$) and the input current command upper limit value ($I_{PFC\_d\_Ref\_Max}$) have an excessive margin therebetween, and the excessive margin increases the possibility of overcurrent occurrence.

Figure 3A:
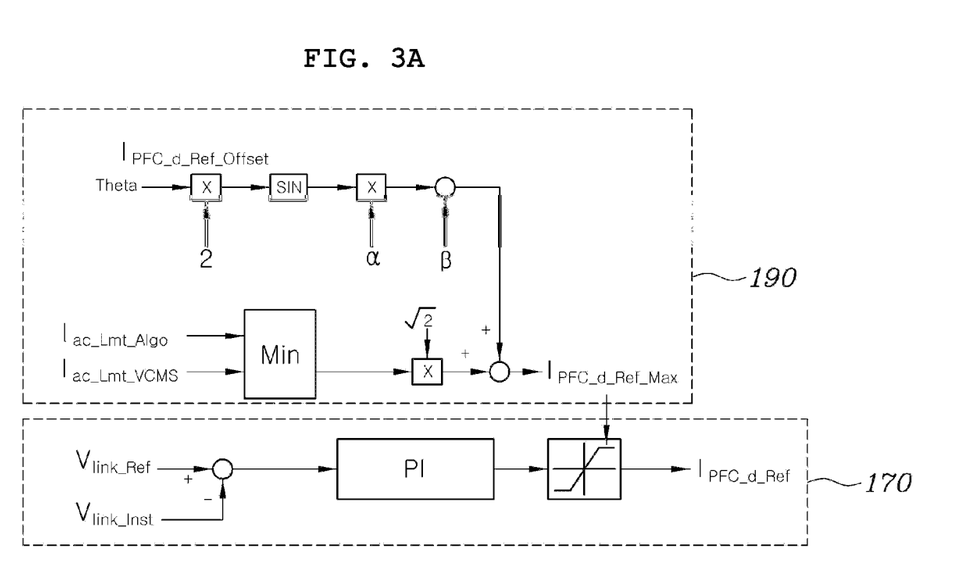
FIG. 3A illustrates a PFC control device according to an embodiment of the disclosure.

FIG. 3A illustrates a PFC control device according to an embodiment of the disclosure. More specifically, FIG. 3A illustrates the operation of the voltage controller 170 and the current command upper limit generator 190 of the PFC control device 160 according to an embodiment of the disclosure.

Referring to FIG. 3A, the current command upper limit generator 190 of the PFC control device 160 according to an embodiment of the disclosure calculates the input current command upper limit value of the PFC 130 based on the input current limit value and the input current command offset value ($I_{PFC\_d\_Ref\_Offset}$), which are configured for the PFC 130.

In an embodiment of the disclosure, the input current limit value may be the smaller value among an internal input current limit value ($I_{ac\_Lmt\_Algo}$) predetermined with regard to the PFC and an external input current limit value ($I_{ac\_Lmt\_VCMS}$) to be determined by another controller (e.g., a charge management system controller and the like).

According to an embodiment of the disclosure, the input current command offset ($I_{PFC\_d\_Ref\_Offset}$) is calculated to have an AC component.

In an embodiment of the disclosure, the input current command offset ($I_{PFC\_d\_Ref\_Offset}$) may be calculated based on the phase component (theta) for synchronization with the power source current applied to the PFC from the external AC power source.

In an embodiment of the disclosure, the phase component (theta) may be a value calculated from the external AC power by means of a phase locked loop (PLL). As such, the input current command upper limit value is calculated using the phase component value of the PLL controller, and the input current command is calculated using the calculated input current command upper limit value. Therefore, when the AC system power frequency changes during charging of a vehicle, the change can be reflected in the output of the voltage controller, that is, the input current command, and thus adverse conditions that occur during charging can be quickly managed to enable stable charging.

First, the current command upper limit generator 190 detects the phase component (theta), which is derived from the external AC power source 110 by means of the PLL. A value for forming a sine wave is calculated by applying a sine function on the detected phase component. The calculated sine wave value is multiplied by an alpha value ($\alpha$) that allows the sine wave formed by the sine wave value to have the same AC component shape as that of the input current command.

Here, the alpha value satisfies the equation of $\alpha = k*\Delta V_{link}$, and $$\Delta V_{link} = \frac{P_0}{2\pi f_{ac} \cdot V_{link} \cdot C_{link}}$$

($V_{link}$: link voltage, $f_{ac}$: external AC voltage frequency, and $P_o$: output power). The equation is obtained based on that 120 Hz ripple of the input current command is proportional to 120 Hz ripple of the output link voltage, and it is possible to form a waveform having the same AC component shape as that of the input current command by multiplying the phase component (theta) value, obtained by applying the sine function, by $\Delta V_{link}$.

The input current command offset ($I_{PFC\_d\_Ref\_Offset}$) calculated according to an embodiment of the disclosure has the same AC component shape as that of the input current command. The input current command upper limit value ($I_{PFC\_d\_Ref\_Max}$) calculated therefrom may have the same AC component shape as that of the input current command, and the calculated input current command upper limit value ($I_{PFC\_d\_Ref\_Max}$) may be expressed as the equation $I_{PFC\_d\_Ref\_Max} = \sqrt{2}*\text{Min}$ ($I_{ac\_Lmt\_Algo}$, $I_{ac\_Lmt\_VCMS}$)+$\alpha*\sin(2\theta)+\beta$.

The voltage controller 170 of the PFC control device 160 according to an embodiment of the disclosure receives the output link voltage command value ($V_{link\_Ref}$) and the output link voltage sensing value ($V_{link\_Inst}$) and performs a control technique for minimizing the error, and then reflects the input current command upper limit value ($I_{PFC\_d\_Ref\_Max}$) derived from the current command upper limit generator 190 so as to derive the input current command value ($I_{PFC\_d\_Ref}$).

Here, the control technique for minimizing the error may be control techniques known in the art, such as proportional control in which the error between the output link voltage sensing value ($V_{link\_Inst}$) and the output link voltage command value ($V_{link\_Ref}$) is multiplied by a proportional constant, integral control for integrating the error between the output link voltage sensing value ($V_{link\_Inst}$) and the output link voltage command value ($V_{link\_Ref}$), and differential control for differentiating the error between the output link voltage sensing value ($V_{link\_Inst}$) and the output link voltage command value ($V_{link\_Ref}$). FIG. 3A illustrates proportional integral (PI) control as an example.

In an embodiment of the disclosure, the input current command value is an input current d-axis command value, the input current command upper limit value is an input current d-axis command upper limit value, and the input current command offset value is an input current d-axis command offset value.

Figure 3B:
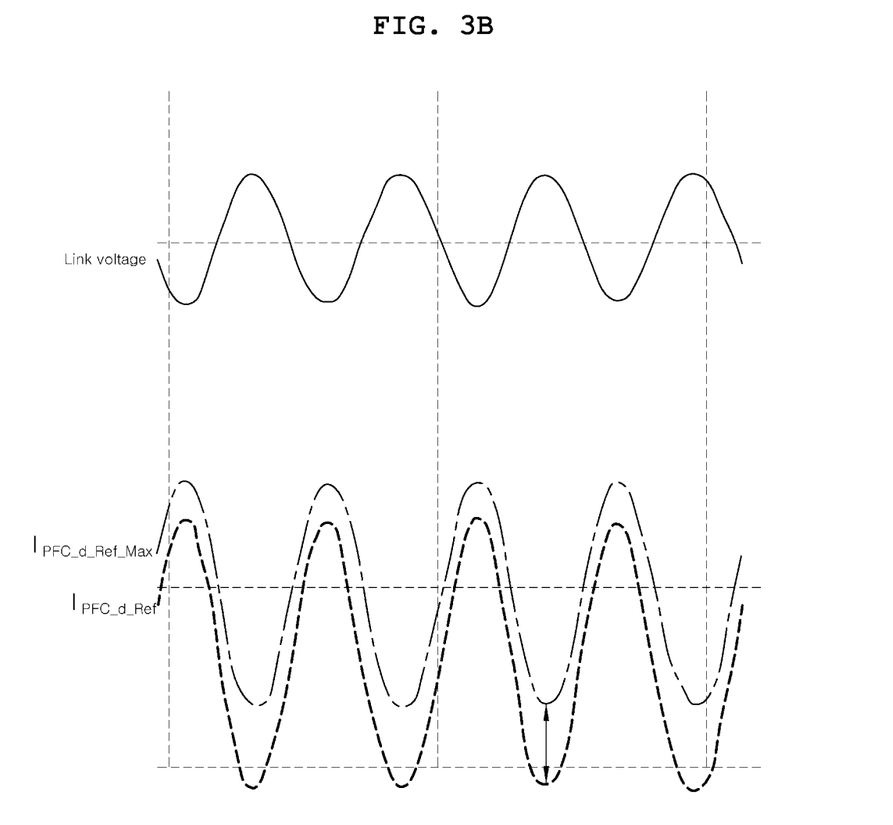
FIG. 3B illustrates a link voltage, which is an output voltage of the PFC, an input current command value calculated based on the link voltage, and an input current command upper limit value according to an embodiment of the disclosure.

FIG. 3B illustrates a link voltage, which is an output voltage of the PFC using the PFC control device 16o, an input current command value ($I_{PFC\_d\_Ref}$) calculated based on the link voltage, and an input current command upper limit value ($I_{PFC\_d\_Ref\_Max}$) according to an embodiment of the disclosure.

Referring to FIG. 3B, the input current command upper limit value ($I_{PFC\_d\_Ref\_Max}$) has the same AC component shape as that of the input current command value ($I_{PFC\_d\_Ref}$) having an AC component, and thus the margin is not large in the entire section of the input current command value ($I_{PFC\_d\_Ref}$). As such, by controlling the PFC 130 using the input current command value ($I_{PFC\_d\_Ref}$) and the input current command upper limit value ($I_{PFC\_d\_Ref\_Max}$) having the same AC component shape as that of the input current command value ($I_{PFC\_d\_Ref}$), the possibility of overcurrent occurrence due to the margin between the input current command and the input current command upper limit can be reduced.

Figure 4:
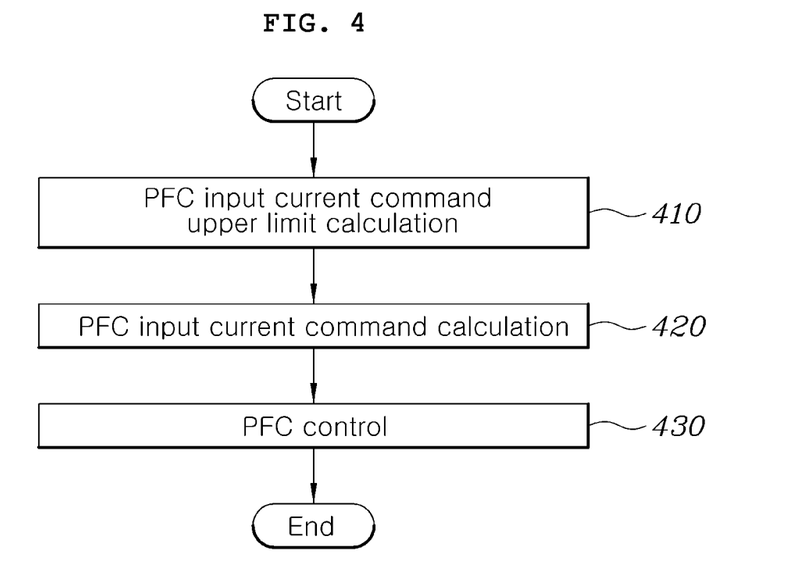
FIG. 4 is a flowchart illustrating a PFC control method according to an embodiment of the disclosure.

FIG. 4 is a flowchart illustrating a PFC control method according to an embodiment of the disclosure.

The PFC control method according to an embodiment of the disclosure may be performed by a single or a plurality of controllers mounted on a vehicle. Alternatively, the PFC control method according to an embodiment of the disclosure may be performed by a single controller, that is, one integrated controller, and in the following description, the controller may be a term collectively referring to multiple controllers or may be referred to as a single integrated controller for performing a function.

Referring to FIG. 4, the PFC control method according to an embodiment of the disclosure is performed through the operations of PFC input current command upper limit calculation 410, PFC input current command calculation 420, and PFC control 430.

In operation 410, the controller calculates an input current command upper limit value for limitation of the upper limit of the input current command value representing the current value required to be applied to the input terminal of the PFC.

In an embodiment of the disclosure, the controller may derive the input current command upper limit value by using the input current command offset value and the input current limit value for limitation of the current input to the PFC. Here, the input current limit value may be the smaller value among an internal input current limit value predetermined with regard to the PFC and an external input current limit value determined by another controller (e.g., a charge management system controller and the like).

The input current command offset according to an embodiment of the disclosure has an AC component. The input current command offset may be calculated based on the phase component (theta) for synchronization with the power source current applied to the PFC from the external AC power source, and the phase component (theta) may be a value calculated from external AC power by means of a phase locked loop (PLL).

In an embodiment of the disclosure, the input current command offset having an AC component may be obtained by detecting a phase component (theta) derived from an external AC power source, calculating a value for forming a sine wave by applying a sine function on the detected phase component, and then multiplying the sine wave value by the alpha value, which causes the sine wave formed by the sine wave value to have the same AC component shape as that of the input current command. The alpha value is a value that allows the input current command offset to have the same AC component shape as that of the input current command, and has a value proportional to the ripple value of the link voltage ($V_{link}$) which is the output, voltage of the PFC.

As such, the controller calculates the input current command upper limit value by using the input current limit value for limitation of the current input to the PFC and the input current command offset value having the same AC component shape as that of the input current command, and thus allows the input current command upper limit value, which is calculated using the input current command offset value, to have the same AC component shape as that of the input current command.

In operation 420, the controller calculates the PFC input current command.

In an embodiment of the disclosure, the controller receives the output voltage of the output terminal of the PFC and the voltage required to be output (that is, the output voltage command), performs control to minimize the error, and then calculates the input current command by using the input current command limit value calculated in operation 410.

Here, the control technique for minimizing the error may be control techniques known in the art, such as proportional control in which the error between the output link voltage sensing value and the output link voltage command value is multiplied by a proportional constant, integral control for integrating the error between the output link voltage sensing value and the output link voltage command value, and differential control for differentiating the error between the output link voltage sensing value and the output link voltage command value.

In operation 430, the controller controls the PFC by using the input current command value calculated in operation 420. More specifically, the controller derives a PFC duty by using the calculated input current command value and the actually sensed input current value, generates a pulse width modulation (PWM) signal having the derived PFC duty value, and transfers the generated PWM signal to a switching element of the PFC so as to control the operation of the switching element. As such, it is possible to control the PFC input terminal current by controlling the PFC using the determined switching duty value.

Figure 5A:
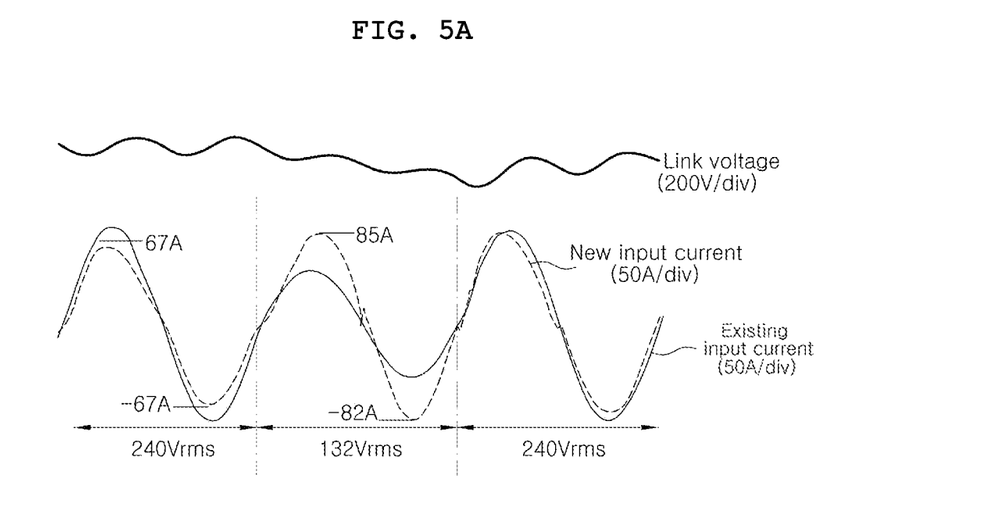
FIG. 5A illustrates an input current value according to the conventional PFC control method.
Figure 5B:
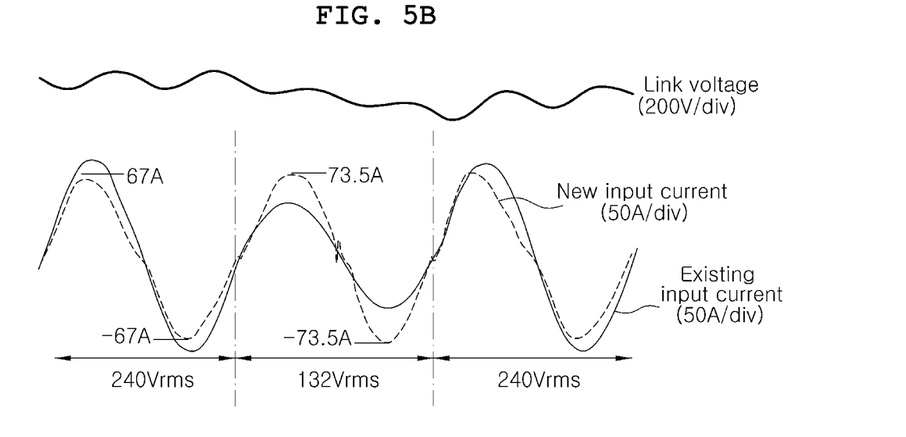
FIG. 5B illustrates an input current value according to the PFC control method according to an embodiment of the disclosure.

FIG. 5A illustrates an input current when PFC control is performed according to the conventional PFC control method, and FIG. 5B illustrates an input current when PFC control is performed by the PFC control method according to an embodiment of the disclosure. In FIGS. 5A and 5B, a current indicated by a solid line is an existing input current (50 A/div), and a current indicated by a dotted line is a newly input and measured current (50 A/div).

Referring to FIG. 5A, in a case in which PFC control is performed by the conventional PCF control method, when the PFC input voltage is sharply dropped (drop from 240 Vrms to 132 Vrms), the input current is abruptly increased from 67 A to 85 A. When the overcurrent flows through the PFC in the above, the EVSE is forcibly shut down and charging is stopped, and thus the driver's convenience is deteriorated.

Referring to FIG. 5B, when PFC control is performed by the PFC control method according to an embodiment of the disclosure, even if a bad condition in which the input voltage of the PFC drops sharply occurs, the input current increases from 67 A to 73.5 A, and thus the current having a value smaller by 11.5 A than that of the prior art is increased. Thereby, it is possible to reduce the possibility of shutdown of the EVSE. According to the PFC control method of embodiments of the disclosure, it is possible to calculate the input current command upper limit value by using the phase component value of the PLL controller, and calculate the input current command by using the calculated input current command upper limit value. Therefore, when the AC system power frequency changes during charging of a vehicle, the change can be immediately reflected in the output of the voltage controller, that is, the input current command, and thus adverse conditions that occur during charging can be quickly managed to enable stable charging.

According to the PFC control method according to the embodiments of the disclosure, the upper limit of the input current command of the PFC is configured to be a value having an AC component rather than a fixed predetermined value, thereby minimizing the margin between the input current command and the input current command upper limit value. Therefore, it is possible to prevent the EVSE from shutting down by suppressing the occurrence of overcurrent due to an excessive margin between the input current command and the input current command upper limit value, thereby providing convenience to a user.

So far the preferable embodiments of the disclosure have been described. Those skilled in the art can appreciate that the disclosure can be implemented in a modified form without departing from the essential characteristics of the disclosure. Therefore, the embodiments should be considered in a descriptive sense and not for purpose of limitation. The scope of the disclosure is defined by the appended claims rather than the foregoing description, and all differences within the scope will be construed as being included in the disclosure.

What is claimed is:

1. A control device comprising:
    a voltage controller configured to output an input current command value of power factor correction (PFC) based on an output voltage and an output voltage command value of the PFC, wherein the input current command value is an input current d-axis command value;
    a current controller configured to control an input current of the PFC by determining a switching duty of the PFC based on the input current command value; and
    a current command upper limit generator configured to output an input current command upper limit value of the PFC based on an input current limit value and an input current command offset value of the PFC, wherein the input current command upper limit value has an alternating current (AC) component, wherein the input current command upper limit value is an input current d-axis command upper limit value and the input current command offset value is an input current d-axis command offset value.

2. The control device of claim 1, wherein the input current command value has the same AC component as that of the input current command upper limit value.

3. The control device of claim 1, wherein the input current command offset value is calculated based on a phase component (theta) value for synchronization with a power source current applied to the PFC from an external AC power source.

4. The control device of claim 3, wherein the phase component (theta) value is a value calculated from the external AC power source using a phase locked loop.

5. The control device of claim 3, wherein the input current command offset value is $$I_{PFC\_d\_Ref\_Offset} = \alpha * \sin(2\theta) \pm \beta,$$

where $\alpha = k * \Delta V_{link}$ is satisfied, and $$\Delta V_{link} = \frac{P_0}{2\pi f_{ac} \cdot V_{link} \cdot C_{link}}$$

where $V_{link}$ is an output voltage, $f_{ac}$ is an external AC voltage frequency, and $P_o$ is an output power.

6. The control device of claim 5, wherein the input current command upper limit value satisfies $$I_{PFC\_d\_Ref\_Offset} = \sqrt{2} * \text{Min}(I_{ac\_Lmt\_Algo}, I_{ac\_Lmt\_VCMS}) + I_{PFC\_d\_Ref\_Offset},$$

wherein $I_{ac\_Lmt\_Algo}$ is an internal input current limit value, $I_{ac\_Lmt\_VCMS}$ is an external input current limit value, and $I_{PFC\_d\_Ref\_Offset}$ is the input current command offset value.

7. The control device of claim 1, wherein the output voltage of the PFC is a direct current link terminal voltage between the PFC and a high voltage converter.

8. The control device of claim 1, wherein the voltage controller is configured to perform proportional integral control such that the output voltage of the PFC follows the output voltage command value.

9. The control device of claim 1, wherein the input current limit value of the PFC is configured to be a smaller value among an internal input current limit value predetermined with regard to the PFC and an external input current limit value determined by another controller.

10. The control device of claim 1, wherein the input current command value is determined based on a value, obtained by performing proportional integral control of the output voltage and the output voltage command value, and the input current command upper limit value.

11. A control method comprising:
    calculating an input current command upper limit value of power factor correction (PFC) based on an input current limit value and an input current command offset value of the PFC, wherein the input current command upper limit value has an AC component;
    calculating an input current command value of the PFC based on an output voltage, an output voltage command value, and the input current command upper limit value of the PFC, wherein the input current command value of the PFC is an input current d-axis command value, the input current command upper limit value is an input current d-axis command upper limit value, and the input current command offset value is an input current d-axis command offset value; and
    controlling the PFC by using the input current command value.

12. The method of claim 11, wherein the input current command value has the same AC component as that of the input current command upper limit value.

13. The method of claim 11, wherein the input current command offset value is calculated based on a phase component (theta) value for synchronization with a power source current applied to the PFC from an external AC power source.

14. The method of claim 13, wherein the phase component (theta) value is a value calculated from the external AC power source using a phase locked loop.

15. The control method of claim 13, wherein the input current command offset value is $$I_{PFC\_d\_Ref\_Offset}=\alpha*\sin(2\text{theta})\pm\beta,$$

where $\alpha=k*\Delta V_{link}$ is satisfied, and $$\Delta V_{link} = \frac{P_0}{2\pi f_{ac} \cdot V_{link} \cdot C_{link}}$$

where $V_{link}$ is an output voltage, $f_{ac}$ is an external AC voltage frequency, and $P_o$ is an output power.

16. The control method of claim 15, wherein the input current command upper limit value satisfies $$I_{PFC\_d\_Ref\_Max}=\sqrt{2}*\text{Min}(I_{ac\_Lmt\_Algo}, I_{ac\_Lmt\_VCMS})+I_{PFC\_d\_Ref\_Offset},$$

wherein $I_{ac\_Lmt\_Algo}$ is an internal input current limit value, $I_{ac\_Lmt\_VCMS}$ is an external input current limit value, and $I_{PFC\_d\_Ref\_Offset}$ is the input current command offset value.

17. The control method of claim 11, wherein the input current limit value of the PFC is configured to be a smaller value among an internal input current limit value predetermined with regard to the PFC and an external input current limit value determined by another controller.

18. The control method of claim 11, wherein the input current command value is determined based on a value, obtained by performing proportional integral control of the output voltage and the output voltage command value, and the input current command upper limit value.

19. A control device comprising: a voltage controller configured to output an input current command value of power factor correction (PFC) based on an output voltage and an output voltage command value of the PFC;
a current controller configured to control an input current of the PFC by determining a switching duty of the PFC based on the input current command value; and
a current command upper limit generator configured to output an input current command upper limit value of the PFC based on an input current limit value and an input current command offset value of the PFC, wherein the input current command upper limit value has an alternating current (AC) component, wherein the input current limit value of the PFC is configured to be a smaller value among an internal input current limit value predetermined with regard to the PFC and an external input current limit value determined by another controller.

20. The control device of claim 19, wherein the input current command offset value is calculated based on a phase component value for synchronization with a power source current applied to the PFC from an external AC power source.

* * * * *

UNITED STATES PATENT AND TRADEMARK OFFICE
CERTIFICATE OF CORRECTION

PATENT NO. : 12,316,214 B2
APPLICATION NO. : 17/872270
DATED : May 27, 2025
INVENTOR(S) : Kim et al.

Page 1 of 1

It is certified that error appears in the above-identified patent and that said Letters Patent is hereby corrected as shown below:

In the Claims

In Column 10, in Claim 5, Line 6, delete "$\alpha*\sin(2\text{theta})\pm\beta$," and insert -- $\alpha*\sin(2\text{theta})+\beta$, --.

In Column 10, in Claim 6, Line 18, delete "$I_{PFC\_d\_Ref\_Offset}=$" and insert -- $I_{PFC\_d\_Ref\_Max}=$ --.

In Column 11, in Claim 15, Line 3, delete "$\alpha*\sin(2\text{theta})\pm\beta$," and insert -- $\alpha*\sin(2\text{theta})+\beta$, --.

Signed and Sealed this
Fifteenth Day of July, 2025

Coke Morgan Stewart
*Acting Director of the United States Patent and Trademark Office*